United States Patent
Freeman-Powell

(10) Patent No.: US 12,088,931 B2
(45) Date of Patent: Sep. 10, 2024

(54) IMAGING SYSTEM AND METHOD

(71) Applicant: JAGUAR LAND ROVER LIMITED, Warwickshire (GB)

(72) Inventor: Aaron Freeman-Powell, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 153 days.

(21) Appl. No.: 17/604,624

(22) PCT Filed: Apr. 10, 2020

(86) PCT No.: PCT/EP2020/060339
§ 371 (c)(1),
(2) Date: Oct. 18, 2021

(87) PCT Pub. No.: WO2020/212287
PCT Pub. Date: Oct. 22, 2020

(65) Prior Publication Data
US 2022/0141383 A1  May 5, 2022

(30) Foreign Application Priority Data
Apr. 19, 2019 (GB) .................................... 1905602

(51) Int. Cl.
*H04N 23/951* (2023.01)
*B60R 1/22* (2022.01)
(Continued)

(52) U.S. Cl.
CPC ............ *H04N 23/951* (2023.01); *B60R 1/22* (2022.01); *H04N 7/181* (2013.01); *H04N 23/64* (2023.01);
(Continued)

(58) Field of Classification Search
CPC .. H04N 23/951; B60R 1/22; B60R 2300/105; B60R 2300/303; B60R 2300/307;
(Continued)

(56) References Cited

U.S. PATENT DOCUMENTS 10,297,034 B2 * 5/2019 Nash .................. G06T 3/0025
10,484,600 B2 * 11/2019 Baek .................. H04N 23/65
(Continued)

FOREIGN PATENT DOCUMENTS

GB            2529408 A     2/2016

OTHER PUBLICATIONS

Combined Search and Examination Report under Sections 17 and 18(3) for Application No. GB1905602.7 dated Oct. 4, 2019.
(Continued)

*Primary Examiner* — Boubacar Abdou Tchoussou
(74) *Attorney, Agent, or Firm* — Carlson, Gaskey & Olds, P.C.

(57) ABSTRACT

Aspects of the present invention relate to a composite image generation system (1) for a vehicle. The system includes one or more controller (10). The composite image generation system (1) has an input configured to receive first image data (DIMG1) from a first imaging device (C1), the first image data (DIMG1) has a first time stamp (TST1-(t)) indicative of a time at which the first image data (DIMG1) was captured by the first imaging device (C1); and second image data (DIMG2) from a second imaging device (C2), the second image data (DIMG2) has a second time stamp (TST2-(t)) indicative of a time at which the second image data (DIMG2) was captured by the second imaging device (C2). The one or more controller (10) is configured to compare the first time stamp (TST1-(t)) with the second time stamp (TST2-(t)) to determine a time stamp discrepancy (TSTΔ). The one or more controller (10) generates composite image
(Continued)

data (DIMG3) comprising at least a part of the first image data (DIMG1) and at least a part of the second image data (DIMG2). The one or more controller (10) is configured to control the output of the composite image data (DIMG3) in dependence on the time stamp discrepancy (TSTΔ). The present invention also relates to a vehicle; and to a method of generating a composite image.

14 Claims, 7 Drawing Sheets

(51) Int. Cl.
    *H04N 7/18*         (2006.01)
    *H04N 23/60*      (2023.01)
    *H04N 23/90*      (2023.01)

(52) U.S. Cl.
    CPC ........... *H04N 23/665* (2023.01); *H04N 23/90* (2023.01); *B60R 2300/105* (2013.01); *B60R 2300/20* (2013.01); *B60R 2300/30* (2013.01)

(58) Field of Classification Search
    CPC B60R 1/00; B60R 1/002; B60R 11/04; B60R 2001/1215; G06T 3/4038; G06T 2207/20212; G06T 2207/30252
    See application file for complete search history.

(56) References Cited

U.S. PATENT DOCUMENTS

| | | | |
|---|---|---|---|
| 10,589,680 B2* | 3/2020 | Ward | B60R 1/002 |
| 10,887,512 B2* | 1/2021 | Murao | H04N 23/665 |
| 11,115,640 B2* | 9/2021 | Hewes | H04N 13/239 |
| 2007/0019311 A1 | 1/2007 | Stricek | |
| 2010/0060735 A1 | 3/2010 | Sato | |
| 2015/0271483 A1* | 9/2015 | Sun | H04N 13/271 |
| | | | 348/187 |
| 2017/0280091 A1 | 9/2017 | Greenwood et al. | |
| 2018/0043828 A1 | 2/2018 | Lu et al. | |
| 2018/0096487 A1* | 4/2018 | Nash | G06T 5/50 |
| 2018/0204072 A1 | 7/2018 | Al Rasheed et al. | |
| 2018/0361930 A1 | 12/2018 | Levi | |

OTHER PUBLICATIONS

International Search Report and Written Opinion of the International Searching Authority for International application No. PCT/EP2020/060339 dated May 20, 2020.

Ehlgen T et al: "Eliminating Blind Spots for Assisted Driving," IEEE Transactions on Intelligent Transportation Systems, IEEE, Piscataway, NJ, USA vol. 9, No. 4, Dec. 1, 2008, pp. 657-665, XP011347144, ISSN: 1524-9050, DOI: 10.1109/TITS.2008.2006815.

* cited by examiner

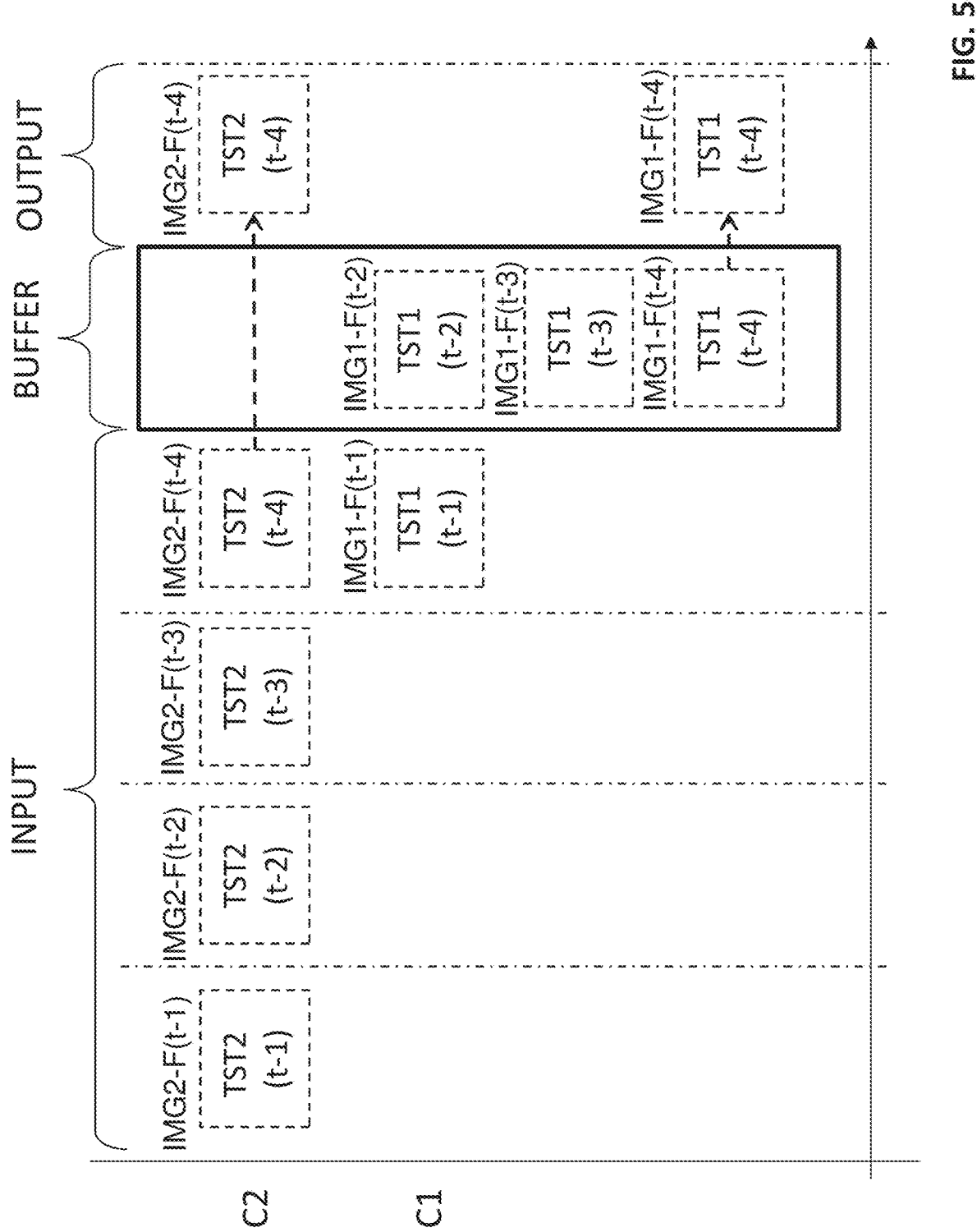

IMAGING SYSTEM AND METHOD

TECHNICAL FIELD

The present disclosure relates to an imaging system and method. Aspects of the invention relate to a composite image generation system; an image processing system; a vehicle; a method of processing an image; computer software and a non-transient computer-readable medium.

BACKGROUND

It is known from UK patent application number GB 1414632.8 to provide a system and apparatus for generating a composite image of a region behind a trailer coupled to a towing vehicle. A controller is provided to generate a composite image by combining a first image captured by a camera provided on the towing vehicle and a second image captured by a camera provided on the trailer. The resulting composite image may include a semi-transparent representation of the trailer to aid assessment of the relative position of other vehicles and objects. It is an aim of the present invention to provide improvements over this system and apparatus.

SUMMARY OF THE INVENTION

Aspects and embodiments of the invention provide a composite image generation system; an image processing system; a vehicle; a method of processing an image; computer software and a non-transient computer-readable medium as claimed in the appended claims According to an aspect of the present invention there is provided a composite image generation system for a vehicle, the composite image generation system comprising one or more controller, the composite image generation system comprising:
  an input configured to receive:
    first image data from a first imaging device, the first image data comprising a first time stamp indicative of a time at which the first image data was captured by the first imaging device;
    second image data from a second imaging device, the second image data comprising a second time stamp indicative of a time at which the second image data was captured by the second imaging device.

The one or more controller may be configured to compare the first time stamp with the second time stamp to determine a time stamp discrepancy. The first time stamp may be compared directly with the second time stamp to determine the time stamp discrepancy.

The one or more controller may be configured to generate composite image data comprising at least a part of the first image data and at least a part of the second image data.

The one or more controller may be configured to control the output of the composite image data in dependence on the time stamp discrepancy.

The first and second imaging devices may have different connections to the controller, depending on the installation in the vehicle. For example, one imaging device may be hardwired to the controller, and the other imaging device may have a wireless connection to the controller (for example over a vehicle network). The transmission times from the wired imaging device to the controller and from the wireless imaging device to the controller may differ from each other. Also, the transmission time for the wireless connection may vary, for example in dependence on external factors. At least in certain embodiments, the present invention may be used to generate a composite image from images that were captured at substantially the same time. This results in a spatially continuous composite image when the vehicle and trailer are moving or if the environment is moving. For example, different sections of the first and second image data may align more closely with each other. If there is a temporal discrepancy in the first and second image data, the same object may be present in both sources of image data combined to form the composite image. As a result, part or all of the object may be duplicated within the composite image. By synchronising the first and second image data, the possibility of the same object (such as another vehicle) being displayed twice within the composite image may be reduced or avoided.

The first image data may comprise a plurality of first image frames. The first time stamp may be applied to each of the first image frames. The first time stamp may indicate a capture time of each of the first image frames. The second image data may comprise a plurality of second image frames. The second time stamp may be applied to each of the second image frames. The second time stamp may indicate a capture time of each of the second image frames.

The composite image data may be generated by combining at least a part of each of the first image frames and at least a part of each of the second image frames. The resulting composite image data may comprise a plurality of composite image frames. The first image frames and the second image frames combined to form the composite image data may have at least substantially the same capture time. The time stamp discrepancy between the two camera streams may be minimised or approximately zero. At least in certain embodiments the first and second images may be aligned and consistent within the composite image.

At least in certain embodiments, the time lag of the composite image (i.e. the difference between the current real time and the image capture time) may be reduced or minimized. The temporal difference between the capture time of the first image and/or the second image and the current real time may be maintained below a threshold.

The controller may be configured to output the composite image data when the time stamp discrepancy is less than a time stamp discrepancy threshold; and to inhibit the output of the composite image data when the time stamp discrepancy is greater than or equal to the time stamp discrepancy threshold.

The controller may control output of the composite image data by selectively enabling/disabling generation of the composite image data. The composite image generation system may comprise an output for outputting the composite image data. The controller may control output of the composite image data by controlling the output to selectively enable/disable the output of the composite image data.

The controller may be configured to output one of the first image data and the second image data when the time stamp discrepancy is greater than or equal to the time stamp discrepancy threshold.

Alternatively, or in addition, the controller may be configured to control the output of the first image data and the second image data in dependence on respective first and second time stamp discrepancies. The first time stamp and/or the second time stamp may be compared with a reference time. The reference time may, for example, comprise an instantaneous (current) time or a time set by a global clock. If the first time stamp discrepancy and/or the second time stamp discrepancy is greater than or equal to a predefined threshold, the output of the first image data and/or the second image data may be inhibited. When the time stamp discrepancy changes from being greater than the time stamp discrepancy threshold to less than the time stamp discrepancy threshold, the controller may be configured to output the composite image data after expiry of a predetermined hysteresis time.

The time stamp discrepancy threshold may be determined in dependence on one or more operating parameters of the vehicle. The one or more operating parameters may comprise at least one of the following:
 a reference speed of the vehicle;
 an articulation angle of a towed vehicle coupled to the vehicle;
 a selected transmission drive ratio; and
 a direction of travel of the vehicle.

The controller may be configured to identify which one of the first time stamp and the second time stamp is indicative of a later image capture time. The controller may buffer the corresponding one of the first image data and the second image data in a memory device. At least in certain embodiments, the buffering of one of the first image data and the second image data enables the generated composite image to be synchronised. The buffering of the first image data and the second image data may be performed up to a threshold time. The threshold time is defined so as to avoid generation of a composite image which may no longer be representative of the current (real world) situation.

The controller may be configured to generate the composite image data by combining at least a part of the one of the first image data and the second image data buffered in the memory device with at least a part of the other one of the first image data and the second image data. By buffering one of the first image data and the second image data, the composite image generation system may at least substantially synchronise the first and second image data prior to generating the composite image data. The resulting composite image may be composed of first and second images captured by the respective first and second imaging devices at least substantially at the same time.

The controller may be configured to buffer either the first image data or the second image data in dependence on the determined time stamp discrepancy. The buffered one of the first image data and the second image data may be buffered for a time period at least substantially equal to the time stamp discrepancy. The first image data and the second image data typically comprise a plurality of image frames. The controller may be configured to determine a number of the image frames in either the first image data or the second image data which would cover the time period. The determined number of image frames may be buffered in the memory device.

The controller may be configured to identify which one of the first time stamp and the second time stamp is indicative of a later image capture time. The controller may modify one or more parameters of the corresponding one of the first image data and the second image data to reduce the time stamp discrepancy. The one or more parameters may comprise at least one of the following: a frame rate, a resolution, a colour content, and a field of view.

The first image data may be received from the first imaging device over a first wireless connection. The second image data may be received from the second imaging device over a second wireless connection. The first and second wireless connections may be separate from each other.

The first image data may be received from the first imaging device over a first wired connection. The second image data may be received from the second imaging device over a second wired connection. The first and second wired connections may be separate from each other.

The one or more controller may be configured to determine which one of the first time stamp and the second time stamp is indicative of a later image capture time and, in dependence on the determination, buffer one of the first image data and the second image data. The one or more controller may be configured to generate composite image data by combining at least a part of the buffered one of the first image data and the second image data with at least a part of the other one of the first image data and the second image data. The one or more controller may be configured to buffer the first image data or the second image data in a memory device.

The one or more controller may be configured to compare the first time stamp with the second time stamp to determine a time stamp discrepancy. The first image data or the second image data may be buffered in dependence on the time stamp discrepancy. The first image data or the second image data may be buffered for a time period at least substantially equal to the time stamp discrepancy.

According to a further aspect of the present invention there is provided a vehicle comprising a composite image generation system as described herein.

According to a still further aspect of the present invention there is provided an image processing system for a vehicle, the system comprising one or more controller, the image processing system comprising:
 an input configured to receive:
  first image data from a first imaging device, the first image data comprising a first time stamp indicative of a time at which the image data was captured by the first imaging device;
  second image data from a second imaging device, the second image data comprising a second time stamp indicative of a time at which the image data was captured by the second imaging device.

The one or more controller may be configured to compare the first time stamp with the second time stamp to determine a time stamp discrepancy.

The output of the first image data and the second image data may be controlled in dependence on the time stamp discrepancy.

According to a further aspect of the present invention there is provided a method of processing image data, the method comprising:
 receiving first image data from a first imaging device, the first image data comprising a first time stamp indicative of a time at which the first image data was captured by the first imaging device;
 receiving second image data from a second imaging device, the second image data comprising a second time stamp indicative of a time at which the second image data was captured by the second imaging device.

The method may comprise comparing the first time stamp with the second time stamp to determine a time stamp discrepancy. The method may comprise generating composite image data comprising at least a part of the first image data and at least a part of the second image data. The output of the composite image data may be is controlled in dependence on the time stamp discrepancy.

The method may comprise outputting the composite image data when the time stamp discrepancy is less than a time stamp discrepancy threshold; and inhibiting the output of the composite image data when the time stamp discrepancy is greater than or equal to the time stamp discrepancy threshold.

The method may comprise outputting one of the first image data and the second image data when the time stamp discrepancy is greater than or equal to the time stamp discrepancy threshold.

The method may comprise outputting the composite image data after expiry of a predetermined hysteresis time following determination that the time stamp discrepancy is less than the time stamp discrepancy threshold.

The time stamp discrepancy threshold may be determined in dependence on one or more operating parameters of the vehicle. The one or more operating parameters may comprise at least one of the following:
- a reference speed of the vehicle;
- an articulation angle of a towed vehicle coupled to the vehicle;
- a selected transmission drive ratio; and
- a direction of travel of the vehicle.

The method may comprise identifying which one of the first time stamp and the second time stamp is indicative of a later image capture time. The corresponding one of the first image data and the second image data may be buffered.

The method may comprise generating the composite image data by combining at least a part of the one of the first image data and the second image data buffered in the memory device with at least a part of the other one of the first image data and the second image data.

The first image data or the second image data may be buffered in dependence on the time stamp discrepancy. The buffered one of the first image data and the second image data may optionally be buffered for a time period at least substantially equal to the time stamp discrepancy.

The method may comprise identifying which one of the first time stamp and the second time stamp is indicative of a later image capture time. The method may comprise modifying one or more parameters of the corresponding one of the first image data and the second image data to reduce the time stamp discrepancy. The one or more parameters may optionally comprise one or more of the following: a frame rate, a resolution, a colour content, and a field of view.

The first image data may be received from the first imaging device over a first wireless connection. The second image data may be received from the second imaging device over a second wireless connection. The first and second wireless connections may be separate from each other.

The first image data may be received from the first imaging device over a first wired connection. The second image data may be received from the second imaging device over a second wired connection. The first and second wired connections may be separate from each other.

The method may comprise determining which one of the first time stamp and the second time stamp is indicative of a later image capture time. In dependence on the determination, one of the first image data and the second image data may be buffered. The method may comprise generating composite image data. The composite image data may be generated by combining at least a part of the buffered one of the first image data and the second image data with at least a part of the other one of the first image data and the second image data. The method may comprise buffering the first image data or the second image data in a memory device.

The method may comprise comparing the first time stamp with the second time stamp to determine a time stamp discrepancy. The first image data or the second image data may be buffered in dependence on the determined time stamp discrepancy. The first image data or the second image data may be buffered for a time period at least substantially equal to the time stamp discrepancy.

According to a further aspect of the present invention there is provided computer software that, when executed, is arranged to perform a method described herein.

According to a further aspect of the present invention there is provided a non-transitory, computer-readable storage medium storing instructions thereon that, when executed by one or more electronic processors, causes the one or more electronic processors to carry out the method described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 5 shows a schematic representation of the buffering process for synchronising image data received from the towing vehicle imaging device and the towed vehicle imaging device;

DETAILED DESCRIPTION

A composite image generation system 1 in accordance with an embodiment of the present invention will now be described with reference to the accompanying figures. The composite image generation system 1 is configured to combine at least a portion of a towed vehicle image IMG1 and at least a portion of a towing vehicle image IMG2 to form a composite image IMG3.

Figure 1:
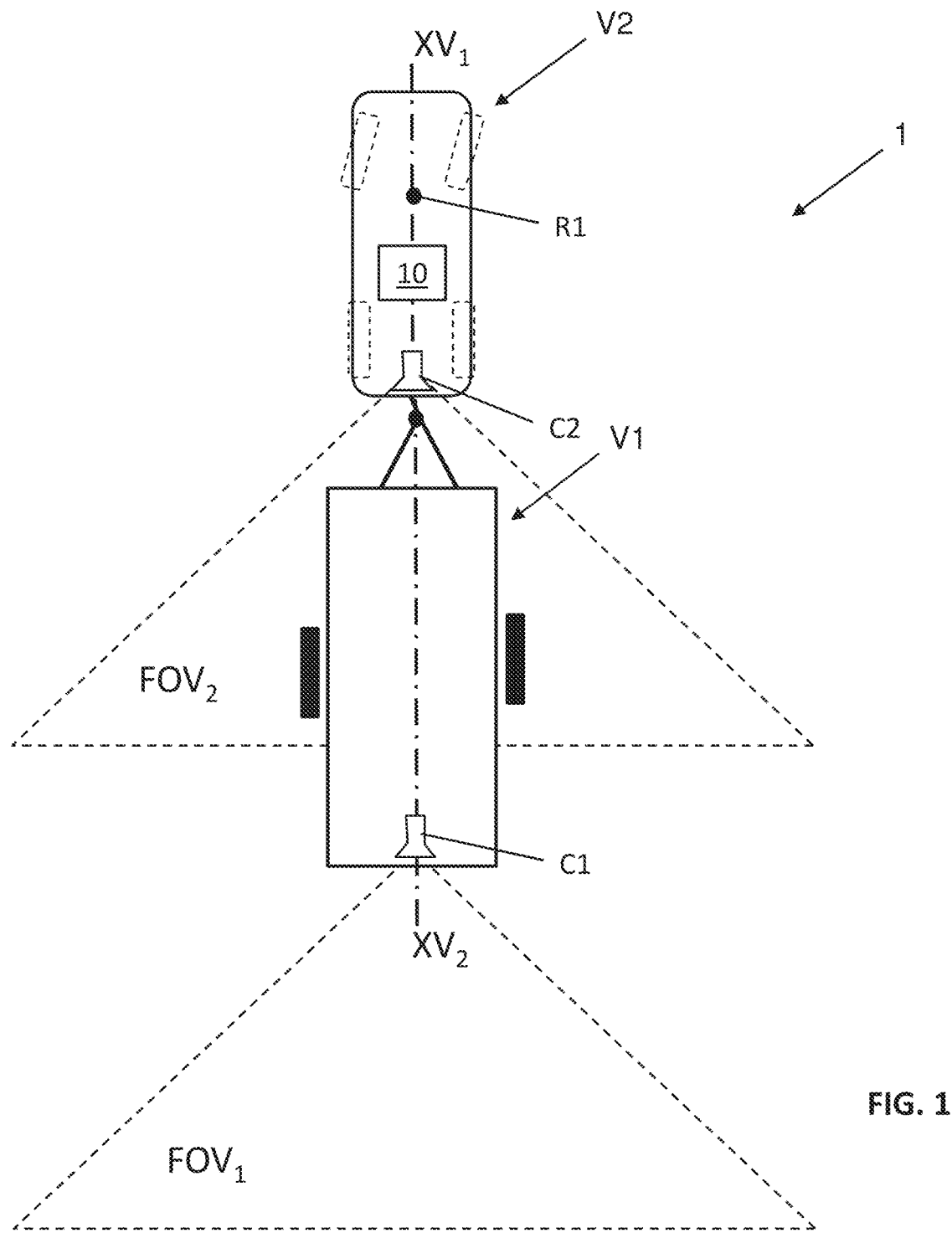
FIG. 1 shows a schematic representation of a composite image generation system according to an embodiment of the present invention provided in a towing vehicle and a towed vehicle.
Figure 2:
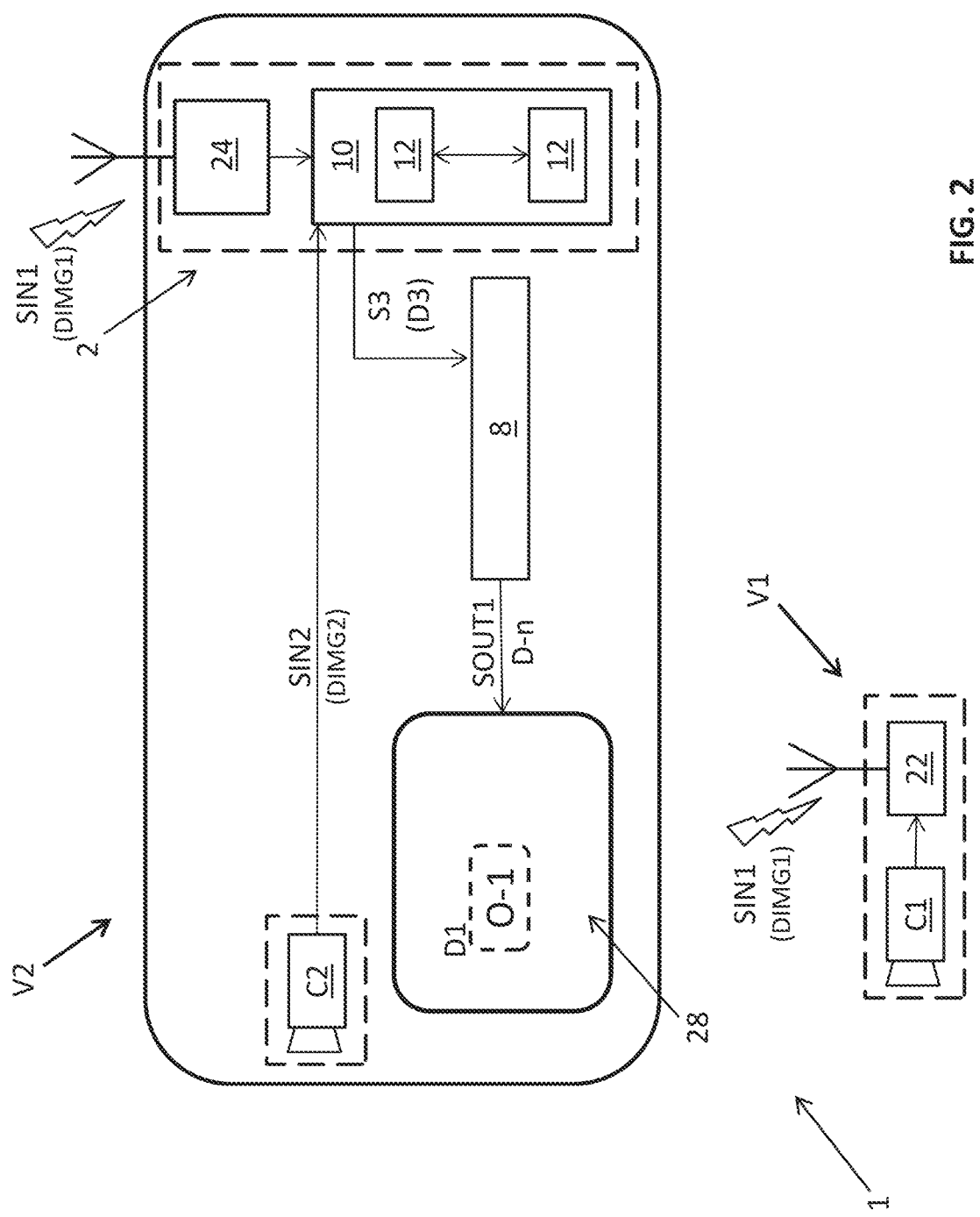
FIG. 2 shows a schematic representation of the towing vehicle incorporating a controller for implementing the composite image generation system shown in FIG. 1.

The composite image generation system 1 is suitable for use in a towing vehicle V2 which is coupled to a towed vehicle V1. In the present embodiment, the towing vehicle V2 and the towed vehicle V1 are connected to each other by an articulated coupling. A schematic representation of the towing vehicle V2 and the towed vehicle V1 is shown in FIG. 1. The towing vehicle V2 in the present embodiment is an automobile. Other types of towing vehicle V2 are contemplated, such as a utility vehicle, a sports utility vehicle, a tractor, a truck etc. The towed vehicle V1 in the present embodiment is a trailer. The towed vehicle V1 has a first longitudinal axis XV1; and the towing vehicle V2 has a second longitudinal axis XV2. A schematic representation of the towing vehicle V2 is shown in FIG. 2.

Figure 3A:
FIG. 3A shows a towing vehicle image captured by an imaging device disposed in the towing vehicle.

A first imaging device C1 is disposed on the towed vehicle V1 and oriented in a rear-facing direction. The first imaging device C1 is mounted centrally at the rear of the towed vehicle V1, for example above a rear license plate (not shown). Other mounting locations for the first imaging device C1 are contemplated. The first imaging device C1 comprises a towed vehicle camera C1. The towed vehicle camera C1 has an optical axis substantially parallel to the first longitudinal axis XV1. The towed vehicle camera C1 has a first field of view FOV1 which encompasses a region to the rear of the towed vehicle V1. The In use, the towed vehicle camera C1 generates first image data DIMG1 corresponding to a towed vehicle image IMG1. The towed vehicle image IMG1 comprises a rear-facing scene from the towed vehicle V1 captured by the towed vehicle camera C1. The towed vehicle image IMG1 may, for example, include an image of a section of road behind the towed vehicle V1. The towed vehicle image IMG1 may include one or more objects of interest O-n. The objects of interest O-n may, for example, comprise one or more other vehicles travelling behind the towed vehicle V1 and/or offset laterally from the towed vehicle V1. The towed vehicle camera C1 outputs a first signal SIN1 comprising said first image data DIMG1 corresponding to the towed vehicle image IMG1. A towed vehicle image IMG1 is shown in FIG. 3A by way of example.

Figure 3B:
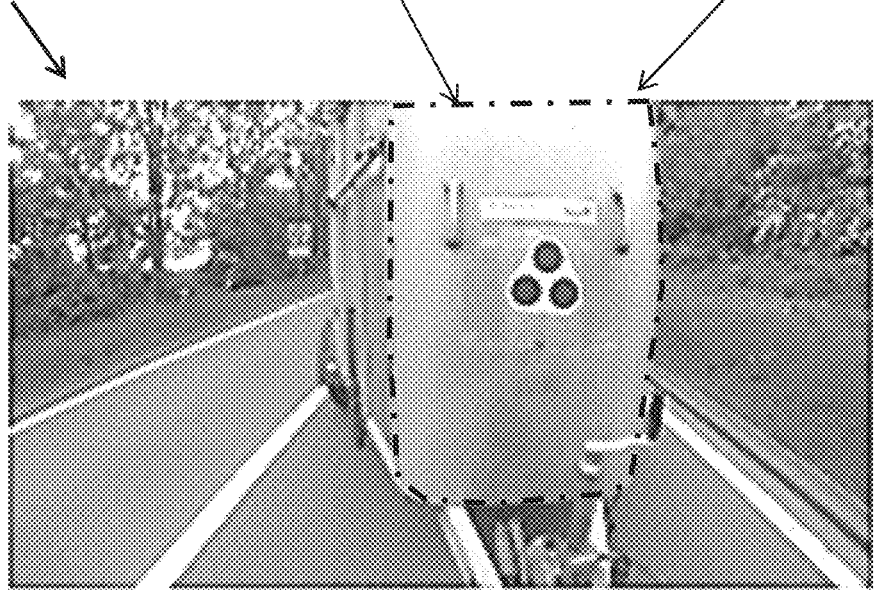
FIG. 3B shows a towed vehicle image captured by an imaging device disposed in the towed vehicle.

A second imaging device C2 is disposed on the towing vehicle V2 and oriented in a rear-facing direction. The second imaging device C2 is mounted centrally at the rear of the towing vehicle V2, for example above a rear license plate (not shown). Other mounting locations for the second imaging device C2 are contemplated. The second imaging device C2 comprises a towing vehicle camera C2. The towing vehicle camera C2 has an optical axis substantially parallel to the second longitudinal axis XV2. The towing vehicle camera C2 has a second field of view FOV2 which encompasses a region to the rear of the towing vehicle V2. In use, the towing vehicle camera C2 generates second image data DIMG2 corresponding to a towing vehicle image IMG2. The towing vehicle image IMG2 comprises a rear-facing scene from the towing vehicle V2 captured by the towing vehicle camera C2. The towing vehicle image IMG2 may, for example, include at least a portion of a front of the towed vehicle V1 as well as some of the environment around the towed vehicle V1, for example to the sides and/or above and/or below the towed vehicle V1. The towing vehicle camera C2 outputs a second signal SIN2 comprising said second image data DIMG2 corresponding to the towing vehicle image IMG2. A towing vehicle image IMG2 is shown in FIG. 3B by way of example. As shown in FIG. 3B, the towed vehicle V2 is visible in the towing vehicle image IMG2 and partially obscures the field of view.

The towed vehicle camera C1 and the towing vehicle camera C2 are digital video cameras. The towed vehicle camera C1 is operable to capture a plurality of first image frames IMG1-F(n) per second. The towing vehicle camera C2 is operable to capture a plurality of second image frames IMG2-F(n) per second. The towed vehicle camera C1 and the towing vehicle camera C2 each have a wide-angle lens with an angle of view of approximately 180°. The angle of view of the towed vehicle camera C1 and the towing vehicle camera C2 could be narrower. The towed vehicle camera C1 and/or the towing vehicle camera C2 may be a mono camera or a stereo camera. The towed vehicle camera C1 can function as a reversing camera to provide a parking aid when the towed vehicle V1 is coupled to the towing vehicle V2. The towing vehicle camera C2 can function as a reversing camera to provide a parking aid when the towed vehicle V1 is not coupled to the towing vehicle V2. The towed vehicle camera C1 and the towing vehicle camera C2 are arranged at approximately the same vertical height above ground level. In alternate arrangements, the towing vehicle camera C2 and the towed vehicle camera C1 may be offset from each other in a vertical direction and/or a transverse direction. A correction may be applied to allow for any vertical offset between the towed vehicle camera C1 and the towing vehicle camera C2. Alternatively, or in addition, a correction may be applied to correct for an angular offset between the towed vehicle camera C1 and the towing vehicle camera C2.

The towed vehicle camera C1 and the towing vehicle camera C2 are digital video cameras. The towed vehicle camera C1 is operable to capture a plurality of first image frames IMG1-F(t) per second. The towing vehicle camera C2 is operable to capture a plurality of second image frames IMG2-F(t) per second. In the present embodiment, the towed vehicle camera C1 and the towing vehicle camera C2 are configured to generate first and second time stamps TST1-($t$), TST2-($t$) which are applied to the first and second image frames IMG1-F(t), IMG2-F(t) respectively. The first and second time stamps TST1-($t$), TST2-($t$) indicate a time at which each of the first and second image frames IMG1-F(t), IMG2-F(t) is captured.

The composite image generation system 1 comprises one or more controller 10. The controller 10 is in communication with the first imaging device C1 and the second imaging device C2. The composite image generation system 1 is configured to receive the first image data DIMG1 from the first imaging device C1 and the second image data DIMG2 from the second imaging device C2. The first image data DIMG1 includes the first time stamp TST1-($t$) indicative of a time at which the first image data DIMG1 was captured by the first imaging device. The second image data DIMG2 includes the second time stamp TST2-($t$) indicative of a time at which the second image data DIMG2 was captured by the second imaging device C2. The controller 10 compares the first time stamp TST1-($t$) with the second time stamp TST2-($t$) to determine a time stamp discrepancy TSTΔ. The controller 10 generates composite image data DIMG3 comprising at least a part of the first image data DIMG1 and at least a part of the second image data DIMG2. The controller 10 is configured to control the output of the composite image data DIMG3 in dependence on the time stamp discrepancy TSTΔ.

The first and second time stamps TST1-($t$), TST2-($t$) are generated with reference to a system (global) clock. The first and second time stamps TST1-($t$), TST2-($t$) are incorporated into the respective first and second image data DIMG1, DIMG2. The time at which each of the first and second image frames IMG1-F(t), IMG2-F(t) is captured may be determined with reference to the first and second time stamps TST1-($t$), TST2-($t$). The controller 10 provides a clock function which outputs a clock signal CLK. The towed vehicle camera C1 and the towing vehicle camera C2 receive the clock signal CLK, for example during a set-up or calibration routine. The first and second time stamps TST1-(t), TST2-(t) can be synchronised with the clock signal SCLK. In a variant, one of the first and second time stamps TST1-(t), TST2-(t) may be used as a default or reference time. The time stamp discrepancy TSTΔ may be determined as the temporal difference between the first and second time stamps TST1-(t), TST2-(t). The composite image generation system 1 in this variant may operate without a separate clock signal CLK. For example, if one of the towed vehicle camera C1 and the towing vehicle camera C2 is connected to the controller 10 by a wired connection (rather than a wireless connection), the corresponding one of the first and second time stamps TST1-(t), TST2-(t) may be set as the reference time. In this arrangement, only the time stamp discrepancy TSTΔ between the first and second time stamps TST1-(t), TST2-(t) is considered. One of the first and second time stamps TST1-(t), TST2-(t) may be used as a reference time to synchronise the first and second image data DIMG1, DIMG2.

Alternatively, or in addition, the first and second time stamps TST1-(t), TST2-(t) may be used to determine a temporal lag (with respect to real time) of each of the first image data DIMG1 and the second image data DIMG2. The controller 10 may be configured to control output of the first and second image data DIMG1, DIMG2 in dependence on the determined temporal lag. For example, the controller 10 may inhibit output of the first image data DIMG1 and/or the second image data DIMG2 if the determined temporal lag of that data stream is greater than a predefined time threshold.

In the present embodiment, the controller 10 is disposed in the towing vehicle V2. In a variant, the controller 10 could be provided in the towed vehicle V1, or the processing could be performed by separate controllers 10 provided on the towed vehicle V1 and the towing vehicle V2. It is to be understood that the or each controller 10 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 10 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 10 to implement the control techniques described herein (including some or all of the functionality required for the method described herein). The set of instructions could be embedded in said one or more electronic processors of the controller 10; or alternatively, the set of instructions could be provided as software to be executed in the controller 10. A first controller or control unit may be implemented in software run on one or more processors. One or more other controllers or control units may be implemented in software run on one or more processors, optionally the same one or more processors as the first controller or control unit. Other arrangements are also useful.

Figure 6:
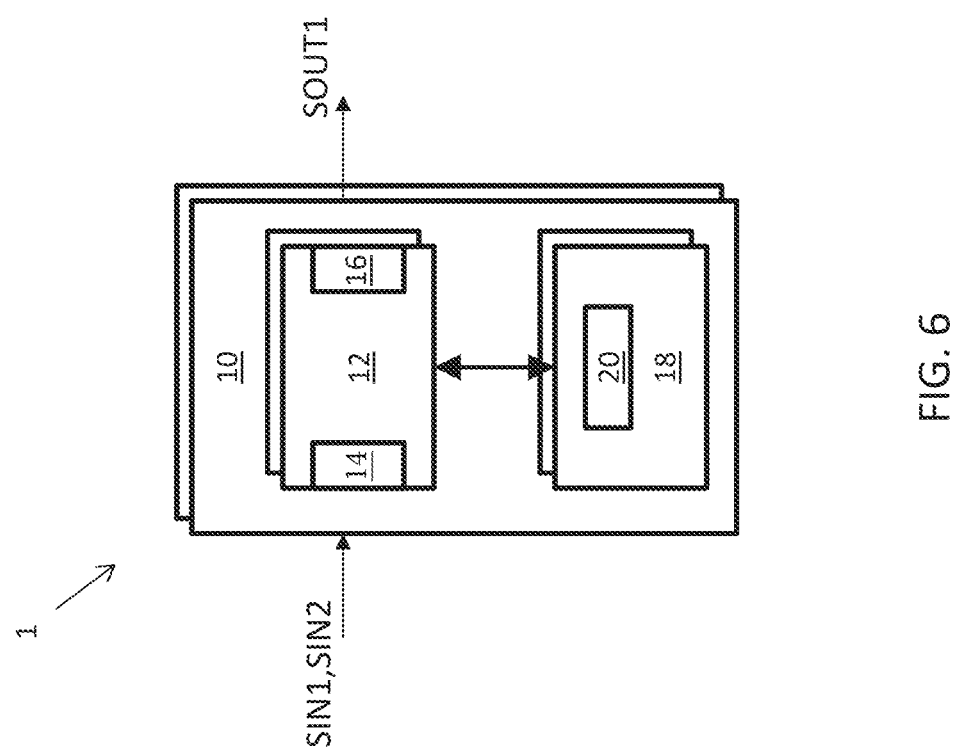
FIG. 6 shows a schematic representation of the controller of the composite image generation system.
Figure 7:
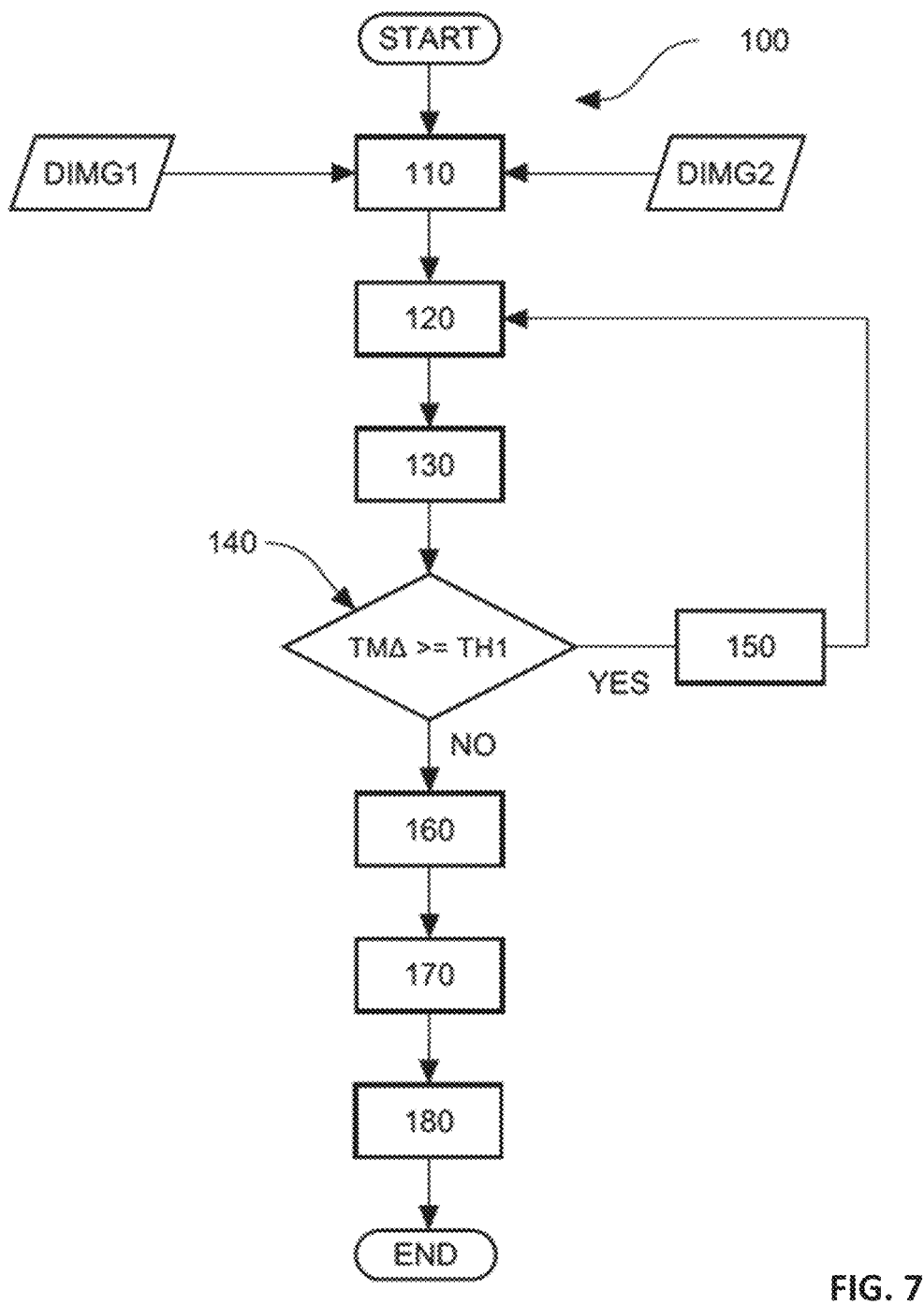
FIG. 7 shows a flow diagram representing operation of the composite image generation system.

As illustrated in FIG. 6, the or each controller 10 comprises at least one electronic processor 12 having one or more electrical input(s) 14 for receiving one or more input signals from the towed vehicle camera C1 and the towing vehicle camera C2; and one or more electrical output(s) 16 for outputting the output signal S1. The or each controller 10 further comprises at least one memory device 18 electrically coupled to the at least one electronic processor 12 and having instructions 20 stored therein. The at least one electronic processor 12 is configured to access the at least one memory device 18 and execute the instructions 20 thereon so as to perform the method(s) described herein.

The, or each, electronic processor 12 may comprise any suitable electronic processor (e.g., a microprocessor, a microcontroller, an ASIC, etc.) that is configured to execute electronic instructions. The, or each, electronic memory device 18 may comprise any suitable memory device and may store a variety of data, information, threshold value(s), lookup tables or other data structures, and/or instructions therein or thereon. In an embodiment, the memory device 18 has information and instructions for software, firmware, programs, algorithms, scripts, applications, etc. stored therein or thereon that may govern all or part of the methodology described herein. The processor, or each, electronic processor 12 may access the memory device 18 and execute and/or use that or those instructions and information to carry out or perform some or all of the functionality and methodology describe herein.

The at least one memory device 18 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

The first signal SIN1 comprising the first image data DIMG1 is input to the controller 10 via the one or more input(s) 14. The connection between the controller 10 and the towed vehicle camera C1 could be a wired connection (for example comprising an electrical connection between the towed vehicle V1 and the towing vehicle V2). In the present embodiment, however, a wireless connection is established between the controller 10 and the towed vehicle camera C1. The towed vehicle camera C1 is connected to a transmitter 22 configured to transmit the first image data DIMG1 as a radio frequency (RF) first signal SIN1 to a receiver 24 provided in the towing vehicle V2. It will be understood that one or more repeater (relay) devices may be provided to relay the first signal SIN1 to the receiver 24 provided in the towing vehicle V2 and/or to enable communication with the towed vehicle camera C1. The receiver 24 is connected to the one or more input(s) 14 of the controller 10. The second signal SIN2 comprising the second image data DIMG2 is input to the controller 10 via the one or more input(s) 14. The connection between the controller 10 and the towing vehicle camera C2 is a wired connection. For example, the towing vehicle camera C2 may be connected to the controller 10 over a vehicle communication network 26, such as an Ethernet/BroadR Reach connection or an uncompressed serialised video connection. In use, the first image data DIMG1 and the second image data DIMG2 is input to the controller 10. The towing vehicle V2 comprises a display screen 28 on which the towed vehicle image IMG1, the towing vehicle image IMG2 (received from the towed vehicle camera C1 and the towing vehicle camera C2 respectively) and the composite image IMG3 can be selectively displayed.

Figure 4A:
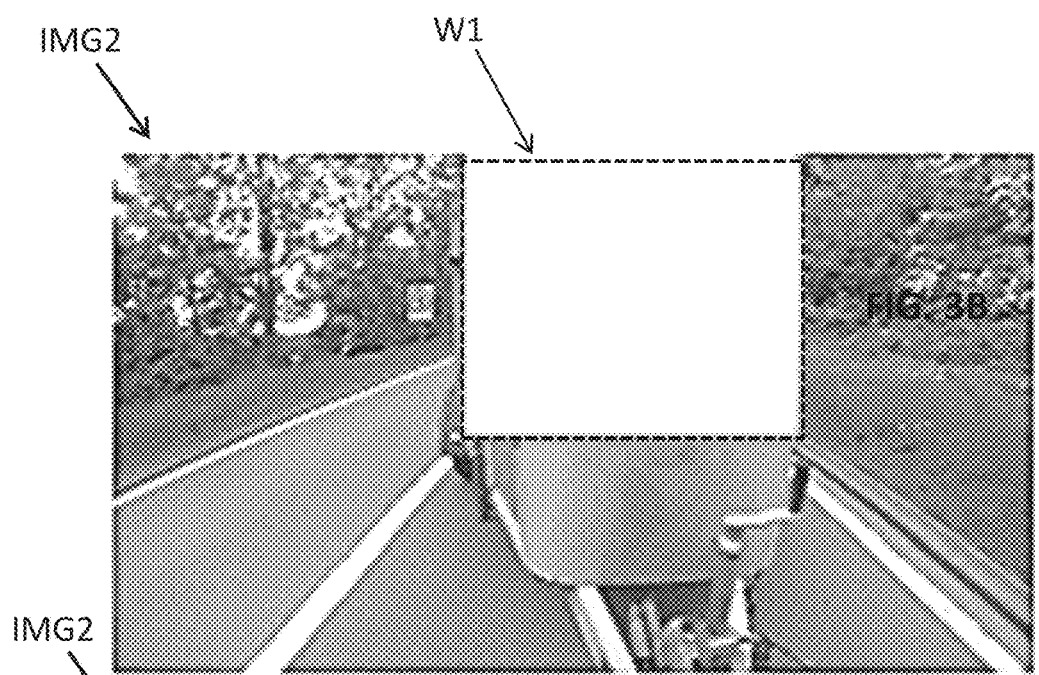
FIG. 4A shows a towed vehicle image modified to include a window coincident with a portion of a front face of the towed vehicle.
Figure 4B:
FIG. 4B shows a composite image composed of the modified towed vehicle image shown in FIG. 4A with a portion of the towed vehicle image shown in FIG. 3B.

The controller 10 is configured to combine at least a portion of the first image IMG1 with at least a portion of the second image IMG2 to generate a composite image IMG3. The controller 10 is configured to analyse the towing vehicle image IMG2 to identify a periphery P1 of the towed vehicle V2. As shown in FIG. 3B, the periphery P1 represents the external visible boundary (or edge) of the towed vehicle V2 from the view point of the towing vehicle camera C1. The controller 10 can identify the periphery P1 by calculating optical flow vectors of pixels between two or more frames of the towing vehicle image IMG2. A gradient of the magnitude of the optical flow vectors is calculated across the towing vehicle image IMG2. The gradient is largest at the periphery P1 of the towed vehicle V2 where pixels associated with a region of the towing vehicle image IMG2 relating to the towed vehicle V2 (and having a relatively low movement) are disposed proximal to or adjacent to pixels associated with a region of the towing vehicle image IMG2 relating to the background (and having a relatively high movement). Other techniques can be used to identify the periphery P1 of the towed vehicle V2. For example, the periphery P1 could be predefined or modelled based on stored geometric data defining the towed vehicle V2. As shown in FIG. 4A, a window W1 is defined within the identified periphery P1. The window W1 is rectangular in the present embodiment, but other shapes may be usefully employed. The region of the towing vehicle image IMG2 enclosed by the periphery P1 represents the towed vehicle V2 within the towing vehicle image IMG2. At least a portion of the towed vehicle image IMG1 is selectively inserted into a region of the towing vehicle image IMG2 disposed inside the identified periphery P1. The controller 10 combines at least a portion of the first image data DIMG1 with at least a portion of the second image data DIMG2 to generate composite image data DIMG3. The controller 10 generates the third image data DIMG3 in dependence on the first and second image data DIMG1, DIMG2 received from the towing vehicle camera C1 and the towed vehicle camera C2. The third image data DIMG3 represents a composite image IMG3 which is output for display on the display screen 10. The first image data DIMG1 and the second image data DIMG2 are combined such that the towed vehicle image IMG1 is overlaid onto a corresponding region of the towing vehicle image IMG2. In the present embodiment, the selected region of the towed vehicle image IMG1 is inserted in the window W1 defined within the periphery P1. The towed vehicle image IMG1 may be rendered as a semi-transparent image such that the features of the towed vehicle V2 present in the towing vehicle image IMG2 remain visible. In the present embodiment the towed vehicle image IMG1 is rendered in the window W1 formed in the towing vehicle image IMG2, as shown in FIG. 4B. The resulting composite image IMG3 provides a substantially continuous, uninterrupted view of the region behind the towing vehicle V1.

The data transfer rates from the towed vehicle camera C1 and the towing vehicle camera C2 may differ. Thus, the first image data DIMG1 and the second image data DIMG2 may be received by the controller 10 at different times, for example caused by a lag or delay in the transmission and/or reception of one of the sets of first and second image data DIMG1, DIMG2. As a result, there may be a temporal offset between the first and second image data DIMG1, DIMG2 received by the controller 10. The data transfer rates may, for example, be dependent on the types of connections between the controller 10 and the towed vehicle camera C1 and the towing vehicle camera C2. In the present embodiment, the towed vehicle camera C1 transmits the first image data DIMG1 over a wireless connection; and the towing vehicle camera C2 transmits the second image data DIMG2 over a wired connection. The wireless transmission of the first image data DIMG1 may result in a delay which is greater than that resulting from the wired transmission of the second image data DIMG2. Other factors may result in a temporal offset between the first and second image data DIMG1, DIMG2 received by the controller 10.

Any temporal offset between the first and second image data DIMG1, DIMG2 may affect awareness or perception of other objects or vehicles. This may be evident when portions of the first and second images IMG1, IMG2 are combined to form the composite image IMG3. The selected portions of the first and second images IMG1, IMG2 are display concurrently within the composite image IMG3. However, if there is a temporal offset between the first and second image data DIMG1, DIMG2 which are combined to generate the composite image data DIMG3, the resulting composite image IMG3 could potentially provide a misleading representation of the current situation.

The controller 10 is configured to monitor the temporal offset between the first and second image data DIMG1, DIMG2. In particular, the controller 10 is configured to monitor the first and second time stamps TST1-($t$), TST2-($t$) to determine any time stamp discrepancy TSTΔ between the first and second image frames IMG1-F(t), IMG2-F(t). The controller 10 is configured to control the generation and output of the composite image IMG3 in dependence on the determined time stamp discrepancy TSTΔ. In particular, the controller 10 is configured to buffer one of the first and second image data DIMG1, DIMG2 to reduce the time stamp discrepancy TSTΔ between the first and second image frames IMG1-F(t), IMG2-F(t) combined to form the composite image IMG3. One or more of the first image frames IMG1-F(t) or one or more of the second image frame IMG2-F(t) are buffered to reduce the time stamp discrepancy TSTΔ. The controller 10 is configured to determine the number of image frames which must be buffered in order to reduce or eliminate the stamp discrepancy TSTΔ. In the present embodiment the controller 10 uses the system memory 18 as a frame buffer. The buffer in the present embodiment functions as a First In First Out (FIFO) buffer. In alternate implementations, a separate frame buffer may be provided to store the first or second image frames IMG1-F(t), IMG2-F(t).

The operation of the controller 10 to reduce the time stamp discrepancy TSTΔ will now be described. The controller 10 determines the first and second time stamps TST1-($t$), TST2-($t$) of the most recent first and second image frames IMG1-F(t), IMG2-F(t) transmitted in as part of the first and second image data DIMG1, DIMG2. The controller 10 identifies which one of the first time stamp TST1-($t$) and the second time stamp TST2-($t$) is indicative of a later image capture time; and buffers the corresponding one of the first image data DIMG1 and the second image data DIMG2 in the system memory 18. The controller 10 identifies which one of the first image data DIMG1 and the second image data DIMG2 comprises image frames IMG1-F(t), IMG2-F(t) having a time stamp TST1-($t$), TST2-($t$) closest to the current time (i.e. closest to the system time set by the clock function). The identified one of the first image data DIMG1 and the second image data DIMG2 is buffered in the system memory 18. The image frames IMG1-F(t), IMG2-F(t) having the more recent time stamp TST1-($t$), TST2-($t$) are buffered. The controller 10 continues to buffer one of the first image data DIMG1 and the second image data DIMG2 until a contemporaneous image frame IMG1-F(t), IMG2-F(t) is available from the other one of the first image data DIMG1 and the second image data DIMG2. The controller 10 then extracts the buffered image frame(s) IMG1-F(t), IMG2-F(t) to form the composite image IMG3. The number of the first or second image frame(s) IMG1-F(t), IMG2-F(t) that must be buffered is substantially equal to the number of image frames which would be displayed during the determined time stamp discrepancy TSTΔ (which is dependent on the frame rate of the associated camera C1, C2).

An example scenario will now be described with reference to FIG. 5. At a reference time t, the controller 10 receives a first image-frame IMG1-F(t-1) from the towed vehicle camera C1 having the first time stamp TST1-(t-1) indicating a first frame capture time t-1. At the same reference time t, the controller 10 receives the second image frame IMG2-F(t-4) from the towing vehicle camera C2 having the second time stamp TST2-(t-4) indicating a second frame capture time t-4. The controller 10 compares the first time stamp TST1-(t-1) and the second time stamp TST2-(t-4) to determine the time stamp discrepancy TSTΔ. The time stamp discrepancy TSTΔ in the present example is three (3) (TSTΔ=TST2-(t-4)−TST1-(t-1)). In order to output synchronised first and second image frames IMG1-F(t-4), IMG2-F(t-4), the controller 10 needs to have already buffered the corresponding first image frame IMG1-F(t-4) captured at time t-4. The system memory 18 buffers the first image frame IMG1-F(t-4) (and the interim first image frames IMG1-F(t-3), IMG1-F(t-2)). The controller 10 outputs the corresponding first and second image frames IMG1-F(t-4), IMG2-F(t-4) to be combined to form the composite image IMG3. It will be understood that the first image frame IMG1-F(t-4) is buffered in this example, and the second image frame IMG2-F(t-4) is unbuffered. The number of first image frame(s) IMG1-F(t-4) buffered in the system storage 18 is three (3), corresponding to the time stamp discrepancy TSTΔ multiplied by the frame rate of the first camera C1. The controller 10 continues to monitor the first and second time stamps TST1-(t), TST2-(t) to ensure that the first and second image frames IMG1-F(t-4), IMG2-F(t-4) which are output are synchronized.

If the time stamp discrepancy TSTΔ is greater than or equal to a predefined time stamp discrepancy threshold TH1, the controller 10 inhibits the generation and output of the composite image IMG3. The time stamp discrepancy threshold TH1 may have a fixed value. The time stamp discrepancy threshold TH1 may be defined as 1 second, 2 seconds or 3 seconds, for example. Alternatively, the time stamp discrepancy threshold TH1 may be set in dependence on one or more operating parameters of the towing vehicle V2. The operating parameter of the towing vehicle V2 may comprise one or more of the following: a reference speed of the towing vehicle V2; an articulation angle between the towed vehicle V1 and the towing vehicle V2; a selected transmission drive ratio of the towing vehicle V2; and a direction of travel of the towing vehicle V2. By way of example, the time stamp discrepancy threshold TH1 may be inversely proportional to a reference speed of the towing vehicle V2. The time stamp discrepancy threshold TH1 may be reduced as the reference speed of the towing vehicle V2 increases. The time stamp discrepancy threshold TH1 may be increased if the towing vehicle V2 is travelling in reverse.

The controller 10 may optionally compare the system clock signal with the first time stamp TST1-(t) and/or the second time stamp TST2-(t). If the controller 10 identifies a time delay which exceeds a predefined maximum time threshold, the output of the first image IMG1 and/or the second IMG2 may be inhibited. This control strategy may also be used to control the output of the composite image IMG3. For example, if the first and second image data DIMG1, DIMG2 are both delayed for a period of time greater than the predefined maximum time threshold, the controller 10 may inhibit output of the composite image IMG3.

Optionally, the system clock can be used to synchronise the capture time of the first and second capture devices C1, C2. This may further improve the synchronisation of the images.

The controller 10 may selectively output the first image IMG1 or the second image IMG2 if the time stamp discrepancy TSTΔ is determined as being greater than or equal to the predefined time stamp discrepancy threshold TH1. The controller 10 continues to monitor the time stamp discrepancy TSTΔ. If the time stamp discrepancy TSTΔ decreases to less than the predefined time stamp discrepancy threshold TH1, the controller 10 is configured to control generation of the composite image IMG3. The output of the composite image IMG3 may be delayed until after expiry of a predetermined hysteresis time. The implementation of the hysteresis time may help to avoid interrupted output of the composite image IMG3, for example due to intermittent delays in the transmission of one of the first and second images IMG1, IMG2 to the controller 10. The hysteresis time is defined to ensure that the composite image IMG3 may be generated with sufficient confidence. The hysteresis time may be defined as 3 seconds, 5 seconds or 10 seconds, for example.

The operation of the composite image generation system 1 will now be described with reference to a flow diagram 100 shown in FIG. 6. The controller 10 receives the first and second image data DIMG1, DIMG2 from the towed vehicle camera C1 and the towing vehicle camera C2 respectively (BLOCK 110). The controller 10 extracts the first time stamp TST1-(t) and the second time stamp TST2-(t) for the first and second images frames IMG1-F(t), IMG2-F(t) (BLOCK 120). The controller 10 determines the time stamp discrepancy TSTΔ by comparing the first time stamp TST1-(t) and the second time stamp TST2-(t) (BLOCK 130). A check is performed to determine if the time stamp discrepancy TSTΔ is within acceptable predefined limits (BLOCK 140). If the time stamp discrepancy TSTΔ is greater than or equal to the predefined time stamp discrepancy threshold TH1, the output of the composite image IMG3 is inhibited (BLOCK 150) and the determination of the time stamp discrepancy TSTΔ is repeated. If the time stamp discrepancy TSTΔ is less than the predefined time stamp discrepancy threshold TH1, the controller 10 identifies which one of the first time stamp TST1-(t), TST2-(t) indicates a later image capture time and buffer the corresponding one of the first image data IMG1-(t) and the second image data IMG2-(t) (BLOCK 160). The controller 10 continues to buffer one of the first image data IMG1-(t) and the second image data IMG2-(t) until the time stamp of the other of the first image data IMG1-(t) and the second image data IMG2-(t) matches (BLOCK 170). The controller 10 then outputs the synchronized first and second images IMG1, IMG2 (BLOCK 180). The controller 10 combines the synchronized first and second images IMG1, IMG2 to form the composite image IMG3 (BLOCK 190).

The composite image generation system 1 controls display of the composite image IMG3 in dependence on the time stamp discrepancy TSTΔ between the capture time of the first and second images IMG1, IMG2 (this affects whether the data streams of one of the first and second image data DIMG1, DIMG2 can be buffered to enable generation of the composite image IMG3). The composite image generation system 1 may optionally also control display of the first image IMG1 and the second image IMG2 in dependence on the time stamp discrepancy TSTΔ between the system global clock CLK and each of the first time stamp TST1-(t) and the second time stamp TST2-(t). The composite image generation system 1 may inhibit display of the first image IMG1 or the second image IMG2 if the determined time stamp discrepancy TSTΔ is greater than a predefined time threshold.

The controller 10 can be configured to output a control signal to control operation of the towed vehicle camera C1 and/or the towing vehicle camera C2, for example to reduce the time stamp discrepancy TSTΔ. The control signal may, for example, control the towed vehicle camera C1 and/or the towing vehicle camera C2 to modify one or more parameters of the first image data and the second image data. The one or more parameters may comprise one or more of the following: a frame rate, a resolution, a colour content, and a field of view.

Example controllers 10 have been described comprising at least one electronic processor 12 configured to execute electronic instructions stored within at least one memory device 18, which when executed causes the electronic processor(s) 12 to carry out the method as herein described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

The embodiment of the present invention described herein comprises first and second image capture devices C1, C2. It will be understood that aspects of the present invention may be incorporated into systems comprising more than two image capture devices C1, C2. Although the first and second image capture devices C1, C2 have been described as being disposed on separate vehicles V1, V2, it will be understood that the first and second image capture devices C1, C2 could be disposed on the same vehicle V1, V2.

The imaging devices C1, C2 described herein comprise digital cameras. The cameras may be optical cameras, for example operating in the visible or non-visible light spectrum. Alternatively, or in addition, the imaging devices C1, C2 may comprise other types of sensors. For example, the imaging devices C1, C2 may comprise one or more of the following: an ultrasonic sensor, a LIDAR sensor and a RADAR sensor.

It will be appreciated that various changes and modifications can be made to the present invention without departing from the scope of the present application.

Aspects of the invention are laid out in the following numbered clauses.

1. A composite image generation system (1) for a vehicle (V1, V2), the composite image generation system (1) comprising one or more controller (10), the composite image generation system (1) comprising:
    an input configured to receive:
        first image data (DIMG1) from a first imaging device (C1), the first image data (DIMG1) comprising a first time stamp (TST1-(t)) indicative of a time at which the first image data (DIMG1) was captured by the first imaging device (C1);
        second image data (DIMG2) from a second imaging device (C2), the second image data (DIMG2) comprising a second time stamp (TST2-(t)) indicative of a time at which the second image data (DIMG2) was captured by the second imaging device (C2);
    the one or more controller (10) being configured to:
        compare the first time stamp (TST1-(t)) with the second time stamp (TST2-(t)) to determine a time stamp discrepancy (TSTΔ); and
        generate composite image data (DIMG3) comprising at least a part of the first image data (DIMG1) and at least a part of the second image data (DIMG2);
    wherein the one or more controller (10) is configured to control the output of the composite image data (DIMG3) in dependence on the time stamp discrepancy (TSTΔ).

2. A composite image generation system (1) according to clause 1, wherein the controller (10) is configured to output the composite image data (DIMG3) when the time stamp discrepancy (TSTΔ) is less than a time stamp discrepancy threshold (TH1); and to inhibit the output of the composite image data (DIMG3) when the time stamp discrepancy (TSTΔ) is greater than or equal to the time stamp discrepancy threshold (TH1).

3. A composite image generation system (1) according to clause 1 or clause 2, wherein the controller (10) is configured to output one of the first image data (DIMG1) and the second image data (DIMG2) when the time stamp discrepancy (TSTΔ) is greater than or equal to the time stamp discrepancy threshold (TH1).

4. A composite image generation system (1) according to any one of clauses 1, 2 or 3, wherein, in dependence on determining that the time stamp discrepancy (TSTΔ) has changed from being greater than the time stamp discrepancy threshold (TH1) to less than the time stamp discrepancy threshold (TH1), the controller (10) is configured to output the composite image data (DIMG3) after expiry of a predetermined hysteresis time.

5. A composite image generation system (1) according to any one of clauses 1 to 4, wherein the time stamp discrepancy threshold (TH1) is determined in dependence on one or more operating parameters of the vehicle (V1, V2).

6. A composite image generation system (1) according to clause 5, wherein the one or more operating parameters comprise at least one of the following:
    a reference speed of the vehicle (V1, V2);
    an articulation angle of a towed vehicle (V1) coupled to the vehicle (V2);
    a selected transmission drive ratio; and
    a direction of travel of the vehicle (V1, V2).

7. A composite image generation system (1) according to any one of the preceding clauses, wherein the controller (10) is configured to identify which one of the first time stamp (TST1-(t)) and the second time stamp (TST2-(t)) is indicative of a later image capture time; and to buffer the corresponding one of the first image data (DIMG1) and the second image data (DIMG2) in a memory device.

8. A composite image generation system (1) according to clause 7, wherein the controller (10) is configured to generate the composite image data (DIMG3) by combining at least a part of the one of the first image data (DIMG1) and the second image data (DIMG2) buffered in the memory device with at least a part of the other one of the first image data (DIMG1) and the second image data (DIMG2).

9. A composite image generation system (1) according to clause 7 or clause 8, wherein one of the first image data (DIMG1) and the second image data (DIMG2) is buffered in dependence on the time stamp discrepancy (TSTΔ); the buffered one of the first image data (DIMG1) and the second image data (DIMG2) optionally being buffered for a time period at least substantially equal to the time stamp discrepancy (TSTΔ).

10. A composite image generation system (1) according to any one of the preceding clauses, wherein the controller (10) is configured to identify which one of the first time stamp (TST1-(t)) and the second time stamp (TST2-(t)) is indicative of a later image capture time; and to modify one or more parameters of the corresponding one of the first image data (DIMG1) and the second image data (DIMG2) to reduce the time stamp discrepancy (TSTΔ); the one or more parameters optionally comprising one or more of the following: a frame rate, a resolution, a colour content, and a field of view.

11. A composite image generation system (1) for a vehicle, the composite image generation system comprising one or more controller (10), the composite image generation system (1) comprising:
an input configured to receive:
first image data (DIMG1) from a first imaging device (C1), the first image data (DIMG1) comprising a first time stamp (TST1-(t)) indicative of a time at which the first image data (DIMG1) was captured by the first imaging device (C1);
second image data (DIMG2) from a second imaging device (C2), the second image data (DIMG2) comprising a second time stamp (TST2-(t)) indicative of a time at which the second image data (DIMG2) was captured by the second imaging device (C2);
the one or more controller (10) being configured to:
determine which one of the first time stamp (TST1-(t)) and the second time stamp (TST2-(t)) is indicative of a later image capture time and, in dependence on the determination, buffer one of the first image data (DIMG1) and the second image data (DIMG2).

12. A vehicle comprising a composite image generation system (1) according to any one of the preceding clauses.

13. A method of processing image data, the method comprising:
receiving first image data (DIMG1) from a first imaging device (C1), the first image data (DIMG1) comprising a first time stamp (TST1-(t)) indicative of a time at which the first image data (DIMG1) was captured by the first imaging device (C1);
receiving second image data (DIMG2) from a second imaging device (C2), the second image data (DIMG2) comprising a second time stamp (TST2-(t)) indicative of a time at which the second image data (DIMG2) was captured by the second imaging device (C2);
comparing the first time stamp (TST1-(t)) with the second time stamp (TST2-(t)) to determine a time stamp discrepancy (TSTΔ); and
generating composite image data (DIMG3) comprising at least a part of the first image data (DIMG1) and at least a part of the second image data (DIMG2);
wherein the output of the composite image data (DIMG3) is controlled in dependence on the time stamp discrepancy (TSTΔ).

14. A method according to clause 13 comprising outputting the composite image data (DIMG3) when the time stamp discrepancy (TSTΔ) is less than a time stamp discrepancy threshold (TH1); and inhibiting the output of the composite image data (DIMG3) when the time stamp discrepancy (TSTΔ) is greater than or equal to the time stamp discrepancy threshold (TH1).

15. A method according to clause 13 or clause 14 comprising outputting one of the first image data (DIMG1) and the second image data (DIMG2) when the time stamp discrepancy (TSTΔ) is greater than or equal to the time stamp discrepancy threshold (TH1).

16. A method according to any one of clauses 13, 14 or 15 comprising outputting the composite image data (DIMG3) after expiry of a predetermined hysteresis time following determination that the time stamp discrepancy (TSTΔ) is less than the time stamp discrepancy threshold (TH1).

17. A method according to any one of clauses 13 to 16, wherein the time stamp discrepancy threshold (TH1) is determined in dependence on one or more operating parameters of the vehicle; the one or more operating parameters comprising at least one of the following:
a reference speed of the vehicle;
an articulation angle of a towed vehicle coupled to the vehicle;
a selected transmission drive ratio; and
a direction of travel of the vehicle.

18. A method according to any one of clauses 13 to 17 comprising identifying which one of the first time stamp (TST1-(t)) and the second time stamp (TST2-(t)) is indicative of a later image capture time; and buffering the corresponding one of the first image data (DIMG1) and the second image data (DIMG2).

19. A method according to clause 18 comprising generating the composite image data (DIMG3) by combining at least a part of the one of the first image data (DIMG1) and the second image data (DIMG2) buffered in the memory device with at least a part of the other one of the first image data (DIMG1) and the second image data (DIMG2).

20. A method according to clause 18 or clause 19, wherein one of the first image data (DIMG1) and the second image data (DIMG2) is buffered in dependence on the time stamp discrepancy (TSTΔ); the buffered one of the first image data (DIMG1) and the second image data (DIMG2) optionally being buffered for a time period at least substantially equal to the time stamp discrepancy (TSTΔ).

21. A method according to any one of clauses 13 to 20 comprising identifying which one of the first time stamp (TST1-(t)) and the second time stamp (TST2-(t)) is indicative of a later image capture time; and modifying one or more parameters of the corresponding one of the first image data (DIMG1) and the second image data (DIMG2) to reduce the time stamp discrepancy (TSTΔ); the one or more parameters optionally comprising one or more of the following: a frame rate, a resolution, a colour content, and a field of view.

22. A method of processing image data, the method comprising:
receiving first image data (DIMG1) from a first imaging device (C1), the first image data (DIMG1) comprising a first time stamp (TST1-(t)) indicative of a time at which the first image data (DIMG1) was captured by the first imaging device (C1);
receiving second image data (DIMG2) from a second imaging device (C2), the second image data (DIMG2) comprising a second time stamp (TST2-(t)) indicative of a time at which the second image data (DIMG2) was captured by the second imaging device (C2);
determining which one of the first time stamp (TST1-(t)) and the second time stamp (TST2-(t)) is indicative of a later image capture time and, in dependence on the determination, buffering one of the first image data (DIMG1) and the second image data (DIMG2).

23. Computer software that, when executed, is arranged to perform a method according to any one of clauses 13 to 22.

24. A non-transitory, computer-readable storage medium storing instructions thereon that, when executed by one or more electronic processors, causes the one or more electronic processors to carry out the method of any one of clauses 13 to 23.

The invention claimed is:

1. A composite image generation system comprising at least one controller, the composite image generation system comprising:
   an input configured to receive:
      first image data from a first imaging device, the first image data comprising a first time stamp indicative of a time at which the first image data was captured by the first imaging device;
      second image data from a second imaging device, the second image data comprising a second time stamp indicative of a time at which the second image data was captured by the second imaging device;
   the at least one controller being configured to:
      compare the first time stamp with the second time stamp to determine a time stamp discrepancy;
      generate composite image data comprising at least a part of the first image data and at least a part of the second image data;
      output the composite image data responsive to the time stamp discrepancy being less than a time stamp discrepancy threshold; and
      inhibit the output of the composite image data when responsive to the time stamp discrepancy being greater than or equal to the time stamp discrepancy threshold.

2. The composite image generation system as claimed in claim 1, wherein the at least one controller is configured to output one of the first image data and the second image data when the time stamp discrepancy is greater than or equal to a time stamp discrepancy threshold.

3. The composite image generation system as claimed in claim 1, wherein, in dependence on determining that the time stamp discrepancy has changed from being greater than a time stamp discrepancy threshold to less than the time stamp discrepancy threshold, the at least one controller is configured to output the composite image data after expiry of a predetermined hysteresis time.

4. The composite image generation system as claimed in claim 1, wherein the at least one controller is configured to determine a time stamp discrepancy threshold in dependence on one or more operating parameters of a vehicle associated with the composite image generation system.

5. The composite image generation system as claimed in claim 4, wherein the one or more operating parameters comprise at least one of the following:
   a reference speed of the vehicle;
   an articulation angle of a towed vehicle coupled to the vehicle;
   a selected transmission drive ratio of the vehicle; and
   a direction of travel of the vehicle.

6. The composite image generation system as claimed in claim 1, wherein the at least one controller is configured to identify which one of the first time stamp and the second time stamp is indicative of a later image capture time and to buffer the later one of the first image data and the second image data in a memory device.

7. The composite image generation system as claimed in claim 6, wherein the at least one controller is configured to generate the composite image data by combining at least a part of the one of the first image data and the second image data buffered in the memory device with at least a part of the other one of the first image data and the second image data.

8. The composite image generation system as claimed in claim 6, wherein the later one of the first image data and the second image data is buffered in dependence on the time stamp discrepancy.

9. The composite image generation system as claimed in claim 8, wherein the buffered one of the first image data and the second image data is buffered for a time period at least substantially equal to the time stamp discrepancy.

10. The composite image generation system as claimed in claim 1, wherein the at least one controller is configured to
    identify which one of the first time stamp and the second time stamp is indicative of a later image capture time; and
    modify one or more parameters of the corresponding one of the first image data and the second image data to reduce the time stamp discrepancy.

11. The composite image generation system as claimed in claim 10, wherein the one or more parameters comprise one or more of the following: a frame rate, a resolution, a color content, and a field of view.

12. A vehicle comprising the composite image generation system as claimed in claim 1.

13. A method of processing image data, the method comprising:
    receiving first image data from a first imaging device, the first image data comprising a first time stamp indicative of a time at which the first image data was captured by the first imaging device;
    receiving second image data from a second imaging device, the second image data comprising a second time stamp indicative of a time at which the second image data was captured by the second imaging device;
    comparing the first time stamp with the second time stamp to determine a time stamp discrepancy;
    generating composite image data comprising at least a part of the first image data and at least a part of the second image data;
    outputting the composite image data responsive to the time stamp discrepancy is being less than a time stamp discrepancy threshold; and
    inhibiting the output of the composite image data responsive to the time stamp discrepancy being greater than or equal to the time stamp discrepancy threshold.

14. A non-transitory, computer-readable storage medium storing instructions that, when executed by one or more electronic processors, causes the one or more electronic processors to carry out the method of claim 13.

* * * * *